Nov. 13, 1945.    A. E. CRAMER    2,388,831
BARBECUE
Filed Oct. 20, 1944
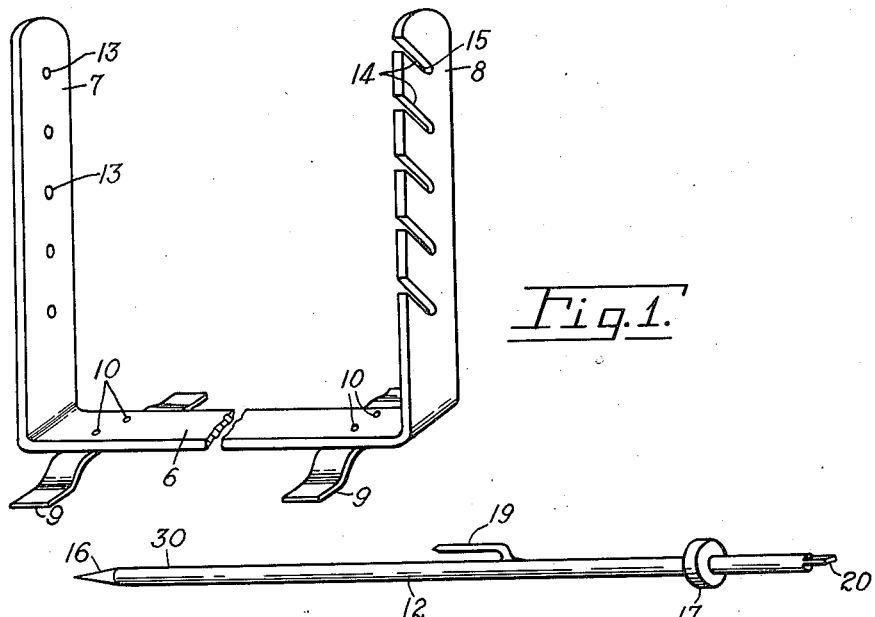
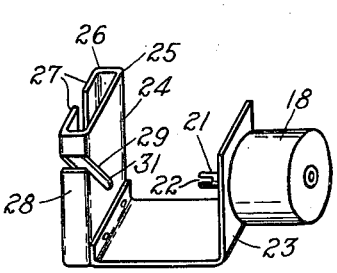
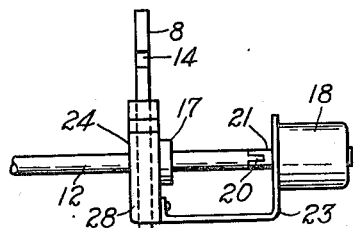
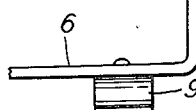
INVENTOR,
ARCHIE E. CRAMER
BY
Zugelter & Zugelter
Atty's.

Patented Nov. 13, 1945

2,388,831

UNITED STATES PATENT OFFICE 2,388,831

BARBECUE

Archie E. Cramer, Silverton, Ohio

Application October 20, 1944, Serial No. 559,488

3 Claims. (Cl. 99—421)

This invention relates to a barbecue or the like.

An object of the invention is to provide a barbecue which is portable, easy to manipulate, and suitable for use before interior fireplaces or heaters as well as fires located outdoors.

Another object is to provide a device of the character stated which is simple and inexpensive, yet durable and effective for properly roasting meats, fish and the like.

Another object is to provide in a device of the type referred to a motor drive assembly for the spit incorporating novel features of adjustment and construction to enhance the utility and convenience of using the device.

These and other objects are attained by the means described herein, and illustrated in the accompanying drawing, in which:

Fig. 1 is a perspective view of the barbecue frame.

Fig. 2 is a perspective view of a spit forming part of the structure.

Fig. 3 is a perspective view of a motor drive assembly for the spit.

Fig. 4 is a fragmental assembly showing the motor in driving relationship with the spit.

The improved barbecue comprises a frame which may include a base portion 6 and a pair of upright standards 7 and 8. The frame may be provided with suitable feet or stabilizing elements 9 to ensure disposition of the standards in the elevated condition. The members 9 may be either permanently or detachably connected to the frame by means of bolts or other fasteners indicated at 10.

As a means of supporting the spit 12, illustrated by Fig. 2, the upright standards of the frame may be provided with perforations and notches or slots, as shown in Fig. 1. One of the standards such as 7, may be perforated at various elevations along its length, as indicated at 13. The standard 8 may have formed therein the open-ended slots 14 spaced apart at distances corresponding with the spacing of the several perforations 13, with the base 15 of each slot located at an elevation corresponding to that of a perforation in the other upright. Thus, when the pointed end 16 of the spit is inserted into a perforation 13, and the spit rests against the base of an inclined slot 14, the spit will extend in substantial parallelism with the base of the frame. It is intended that the spit shall bear against the base of a slot, at a location closely adjacent, and slightly to the left of, the thrust element or head 17. This thrust element or head performs the function of precluding disassociation of the spit from the driving relationship of the motor 18, as will be explained hereinafter.

The spit carries the usual hook or barb 19 intermediate its ends, and at the end opposite the pointed end 16, the spit carries a coupling element 20 of suitable design or construction. For purpose of simplicity and illustration, the coupling element is shown merely as a flattened tongue or extension on the butt end of the spit. Any other form of coupling means, however, is to be considered within the purview of the invention.

By referring to Fig. 3, it will be noted that the shaft 21, which is adapted to be driven by motor 18 at a comparatively slow rate of speed, is slotted as at 22 to receive the tongue 20 of the spit and to thereby effect a driving relationship. The motor constitutes part of a drive assembly for the spit. A bracket 23 for the motor extends laterally from a slide 24, which slide may be in the form of a sleeve adapted to be slid over the upper end of standard 8 and adjusted as to elevation along said standard. The slide may be of any desired construction, a simple form of which is illustrated herein. By way of example, the slide may be formed from a sheet of metal bent along the lines 25 and 26 to provide a way for slideable reception of an upright standard such as 8. The side portions 27 of the slide may be spaced apart as illustrated, or they may be joined together by welding or with the use of any known type of fastener or connecting means.

One edge 28 of the slide is to be notched or slotted at 29, at an inclination corresponding to the inclination of each slot 14 of the upright standard. When the sleeve of the drive assembly is slid onto the standard 8, the inclined slot 29 may be caused to register with any one of the slots 14. With the slots 29 and 14 in register, the spit may be applied to or detached from the structure, by shifting the butt end lengthwise of the slots. As will be understood, the pointed end 16, or some point such as 30 of the spit, will rest within a perforation 13 of the frame with sufficient clearance to permit rotation of the spit.

Fig. 4 shows the drive assembly and the spit in operative relationship to the frame element 8. As shown therein, the spit is resting against the base of the second slot 14 of standard 8, and also against the base 31 of slot 29. With the parts related as illustrated by Fig. 4, the coupling end of the spit aligns with and engages the drive shaft 21, and the spit while bearing against the bases of slots 14 and 29, serves to position and maintain the desired elevation of the slide 24 upon the standard. It will be apparent that the slide may not be shifted longitudinally of the standard, as long as the spit rests within the slots 14 and 29. On the other hand, however, the coupling end of the spit may be grasped and shifted out of the slots at their open ends, for releasing the slide 24. When so released, the slide may be adjusted to any one of the slots 14, or it may be bodily disassociated from the upright standard 8.

The purpose of the thrust collar or head 17 is to prevent longitudinal shifting of the spit to the left, thereby ensuring a coupled relationship with the drive shaft 21 while the device is in operation. The thrust collar ordinarily bears lightly against the inner surface of the slide, near the base of slot 29. The motor 18 may be of any suitable type, preferably electric, and will include suitable reduction gearing to impart a desired slow rotation to the drive shaft 21 and the spit coupled thereto. When used indoors, a grease pan or the like may be supported transversely of the base member 6 to catch any drippings from the food undergoing roasting. Such pan or receptacle may either rest upon the base 6, or upon legs of its own, as may be desired.

From the foregoing, it should be apparent that the device of the invention is simple, easy to manipulate, and durable of construction. It possesses advantages of adjustability in the elevation of the spit, and of being quickly set up for use without the aid of tools. The device obviously may be used indoors as well as outdoors, for the roasting of meat, fish and the like.

It is to be understood that various modifications and changes may be made in the structural details of the device, within the scope of the appended claims, without departing from the spirit of the invention.

What is claimed is:

1. A barbecue apparatus comprising in combination, a frame including a pair of spaced upright standards, a rotatable spit having a pointed end and a butt end, bearing means on one of the standards for supporting the spit near the butt end thereof, said bearing means comprising an inclined open-ended slot in said one standard, the inclination being angularly downward from the open end whereby the spit normally rests upon the base of the slot, bearing means rotationally supporting the opposite end of the spit, a slide shiftable lengthwise of the slotted standard, said slide being slotted in correspondency with the slot of the standard to receive the spit, a driving shaft on the slide aligned with the slot of the slide at its base end, and means for detachably coupling the butt end of the spit to the driving shaft.

2. A barbecue apparatus comprising in combination, a frame including a pair of spaced upright standards, a rotatable spit having a pointed end and a butt end, bearing means on one of the standards for supporting the spit near the butt end thereof, said bearing means comprising an inclined open-ended slot in said one standard, the inclination being angularly downward from the open end whereby the spit normally rests upon the base of the slot, bearing means rotationally supporting the opposite end of the spit, a slide shiftable lengthwise of the slotted standard, said slide being slotted in correspondency with the slot of the standard, with the bases and the open ends of the slots in registry, whereby shifting of the spit out of the slots laterally of the slotted standard releases the slide, and means on the slide for rotating the spit.

3. A barbecue apparatus comprising in combination, a frame including a pair of spaced upright standards, a rotatable spit having a pointed end and a butt end, bearing means on one of the standards for supporting the spit near the butt end thereof, said bearing means comprising an inclined open-ended slot in said one standard, the inclination being angularly downward from the open end whereby the spit normally rests upon the base of the slot, bearing means rotationally supporting the opposite end of the spit, a slide shiftable lengthwise of the slotted standard, said slide being slotted in correspondency with the slot of the standard, with the bases and the open ends of the slots in registry, whereby shifting of the spit out of the slots laterally of the slotted standard releases the slide, the open-ended slots and the bearing means aforesaid being duplicated along the standards at various elevations for adjusitng the elevation of the spit and the slide.

ARCHIE E. CRAMER.